(12) United States Patent
Chang

(10) Patent No.: US 7,302,788 B1
(45) Date of Patent: Dec. 4, 2007

(54) PROTECTING APPARATUS STRUCTURE FOR A HORSE

(76) Inventor: Ju-Sung Chang, No. 100, Lane 290, Jhongjheng Road, Caotun Township, Nantou County (TW)

( * ) Notice: Subject to any disclaimer, the term of this patent is extended or adjusted under 35 U.S.C. 154(b) by 0 days.

(21) Appl. No.: 11/642,768

(22) Filed: Dec. 21, 2006

(51) Int. Cl.
*B68C 5/00* (2006.01)
*A01L 3/06* (2006.01)

(52) U.S. Cl. ............................................. 54/82; 168/18
(58) Field of Classification Search ............... 54/82; 168/1, 18, 22, 4, 12, 14
See application file for complete search history.

(56) References Cited

U.S. PATENT DOCUMENTS

| | | | | |
|---|---|---|---|---|
| 167,895 | A * | 9/1875 | Hall | 168/2 |
| 339,050 | A * | 3/1886 | Drew | 54/82 |
| 388,313 | A * | 8/1888 | Schild | 168/2 |
| 473,295 | A * | 4/1892 | Coates | 168/1 |
| 476,517 | A * | 6/1892 | Clark et al. | 54/82 |
| 625,810 | A * | 5/1899 | Shappell | 168/2 |
| 1,054,563 | A * | 2/1913 | Kiso | 168/1 |
| 1,101,689 | A * | 6/1914 | Fuchs | 168/1 |
| 1,496,511 | A * | 6/1924 | Allman | 168/22 |
| 2,886,935 | A * | 5/1959 | Shelton | 54/71 |
| 4,212,356 | A * | 7/1980 | Battle | 168/18 |
| 5,983,611 | A * | 11/1999 | Smahl et al. | 54/82 |
| 2007/0125555 | A1* | 6/2007 | Puhl | 168/28 |

FOREIGN PATENT DOCUMENTS

DE 3311383 A1 * 10/1984

\* cited by examiner

*Primary Examiner*—Son T. Nguyen
(74) *Attorney, Agent, or Firm*—Bacon & Thomas, PLLC

(57) ABSTRACT

A protecting apparatus structure for protecting a horse's heel includes a protecting board engaged with the rear of the heel, a buffer support plate extended from an internal edge of the protecting board, a protrusion protruded from the center of the buffer support plate for supporting a horse's hoof, symmetric winged plates extended from both sides of the buffer for increasing the supporting area, a metal plate included in the buffer support plate and extended to an appropriate height, a soft protecting plate sewed into an internal edge of the protecting board, a Velcro strap at an upper edge of the protecting plate, and a tying strap at a lower edge of the protecting plate. The buffer support plate provides a buffer for supporting the hoof and preventing discomfort or injury to a horse while the horse is running or jumping and improves the safety protection of the hoof.

2 Claims, 4 Drawing Sheets

PROTECTING APPARATUS STRUCTURE FOR A HORSE

BACKGROUND OF THE INVENTION

1. Field of the Invention

The present invention relates to a protecting apparatus for a horses, and more particularly to a safety apparatus designed for protecting the heels of a horse, such that the rear edge of a horse's heel can be protected, and a buffer support plate extended from the internal edge of the protecting apparatus support the bottom of the includes for supporting the bottom of a horse's hoof, so as to eliminate the pressure exerted onto the horse's hoof and improve the comfort for a horse to wear the protecting apparatus.

2. Description of the Related Art

While a horse is running or jumping, the horse's hoof touches the ground first when it lands, and thus the action impacts the bottom of a horse's hoof and a horse's heel directly at the moment of landing, not only causing discomfort to the horse, but also possibly injuring the horse. Appropriate safety protection and comfort measures are provided for protecting the horse's heel and the bottom of a horse hoof.

Referring to FIG. 1 for a conventional structural design used for a protecting apparatus for a horse, the design includes a hard protecting board 10 engaged with a horse's heel, a buffer support plate 11 extended from the center of the internal edge of the rear portion of the protecting board 10, a L-shaped metal plate 12 is riveted at an upper edge of the buffer support plate 11 by a rivet 16, a soft elastic protecting plate 13 sewed into an internal edge of the protecting board 10, a Velcro strap 14 disposed at an upper edge of the protecting plate 13, and a tying strap 15 disposed at a lower edge of the protecting plate 13 to constitute the basic functional architecture for a horse. The protecting plate 13 is used for wrapping the rear edge of the horse's heel, and the hard protecting board 10 is used for providing appropriate protections and preventing the horse's heel from being hit by external forces. In the meantime, the buffer support plate 11 extended from the protecting board 10 provides a support to the bottom of the horse's hoof, and the buffer support plate 11 is installed precisely to the direct pressure point of the landing of the horse's hoof, and the metal plate 12 is installed at the top of the buffer support plate 11 for enhancing the supporting strength, so that when the horse's hoof lands on a ground, an appropriate buffer can be provided to prevent the horse from being uncomfortable.

Although this conventional protecting apparatus for a horse can provide appropriate protections for the horse's heel, the structural design directly exposes the metal plate that is installed at the top of the buffer support plate, and the metal plate will produce frictions with the bottom of the horse's hoof and heel easily, and thus making the horse uncomfortable. The conventional protecting apparatus definitely requires further improvements.

Since the area of the buffer support plate is too small, the contact area of the buffer support plate with the bottom of the horse's hoof is too small as well, and it will adversely affect the buffering and supporting effects, such that when the horse's hoof lands on a ground, the force cannot be absorbed or offset effectively. The conventional structure intangibly lowers the installation effect, and thus such drawback also requires improvements.

SUMMARY OF THE INVENTION

In view of the foregoing shortcomings of the prior art, the inventor of the present invention based on years of experience in the related industry to conduct extensive researches and experience, and finally developed an improved protecting apparatus for a horse in accordance with the present invention.

The primary objective of the present invention is to overcome the shortcomings of the prior art by providing a protecting apparatus that hides a metal plate inside a buffer support plate, such that the metal plate is not exposed or contacted with the bottom of a horse's hoof or heel, so as to effectively overcome the friction so produced or discomfort to the horse and provide a more comfortable wearing of the protecting apparatus.

Another objective of the present invention is to provide a protecting apparatus with a structure design having two symmetric winged plates extended from both lateral sides of the buffer support plate for increasing the supporting area of the horse's hoof and the buffering effect to enhance the protection and comfort for the horse.

DETAILED DESCRIPTION OF THE PREFERRED EMBODIMENTS

To make it easier for our examiner to understand the objectives, characteristics and effects of the present invention, a preferred embodiment with accompanying drawings are used for a detailed description of the invention as follows.

Figure 3:
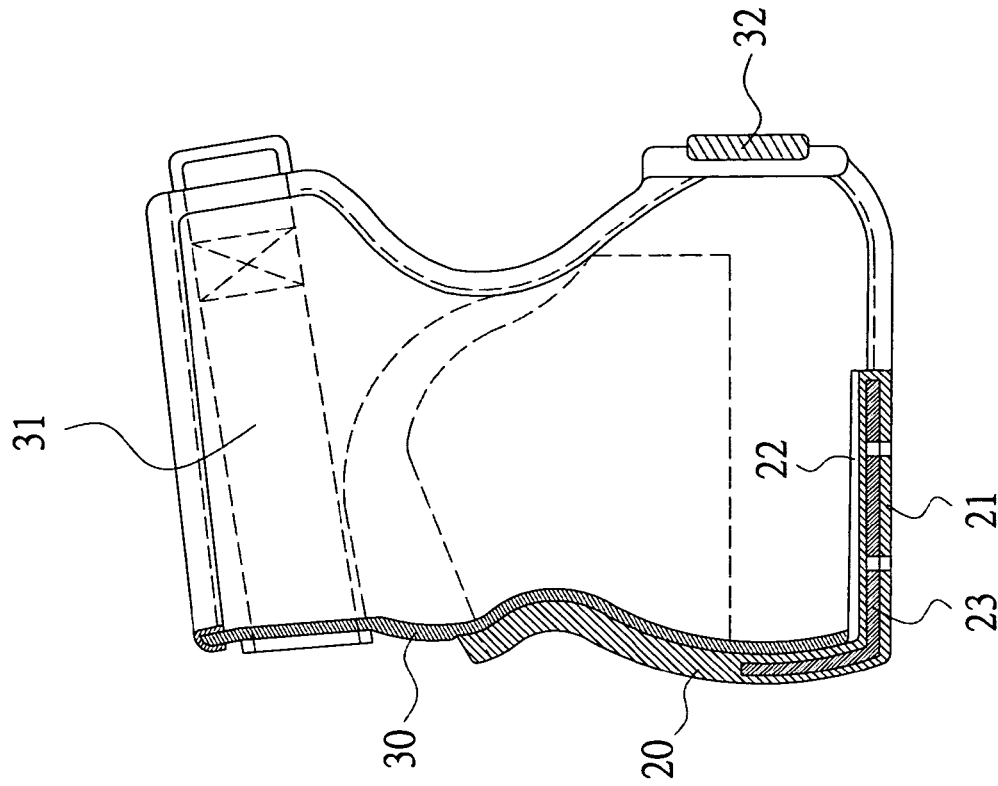
FIG. 3 is a sectional view of Section A-A' of a structural relation of a preferred embodiment of the present invention.
Figure 1:
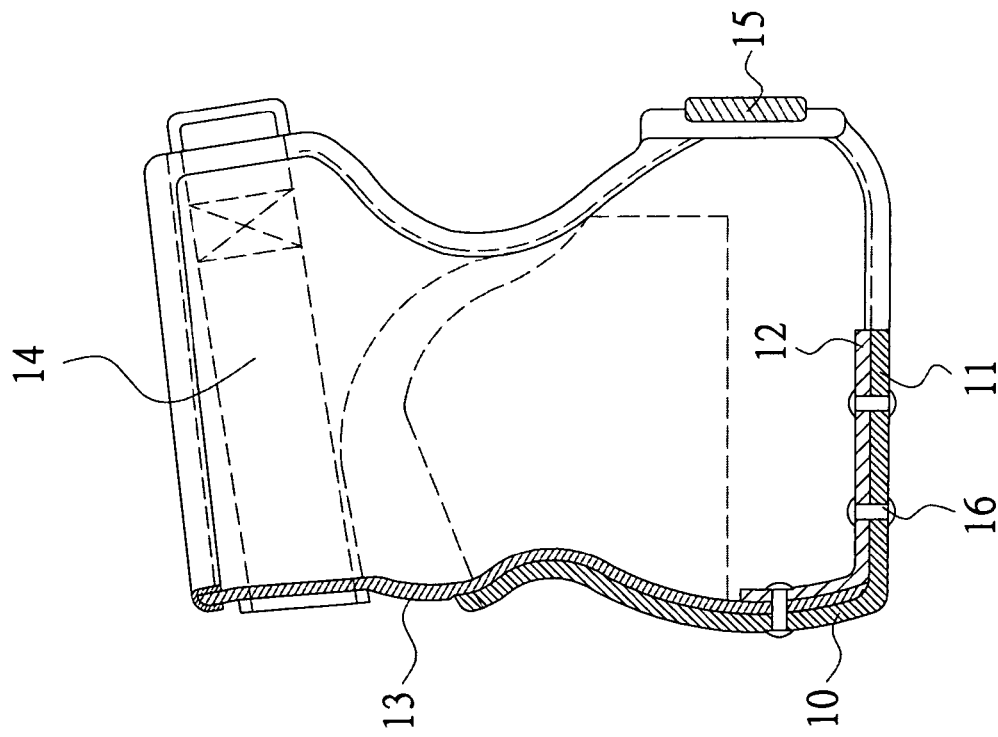
FIG. 1 is a schematic view of a conventional protecting apparatus for a horse.
Figure 2:
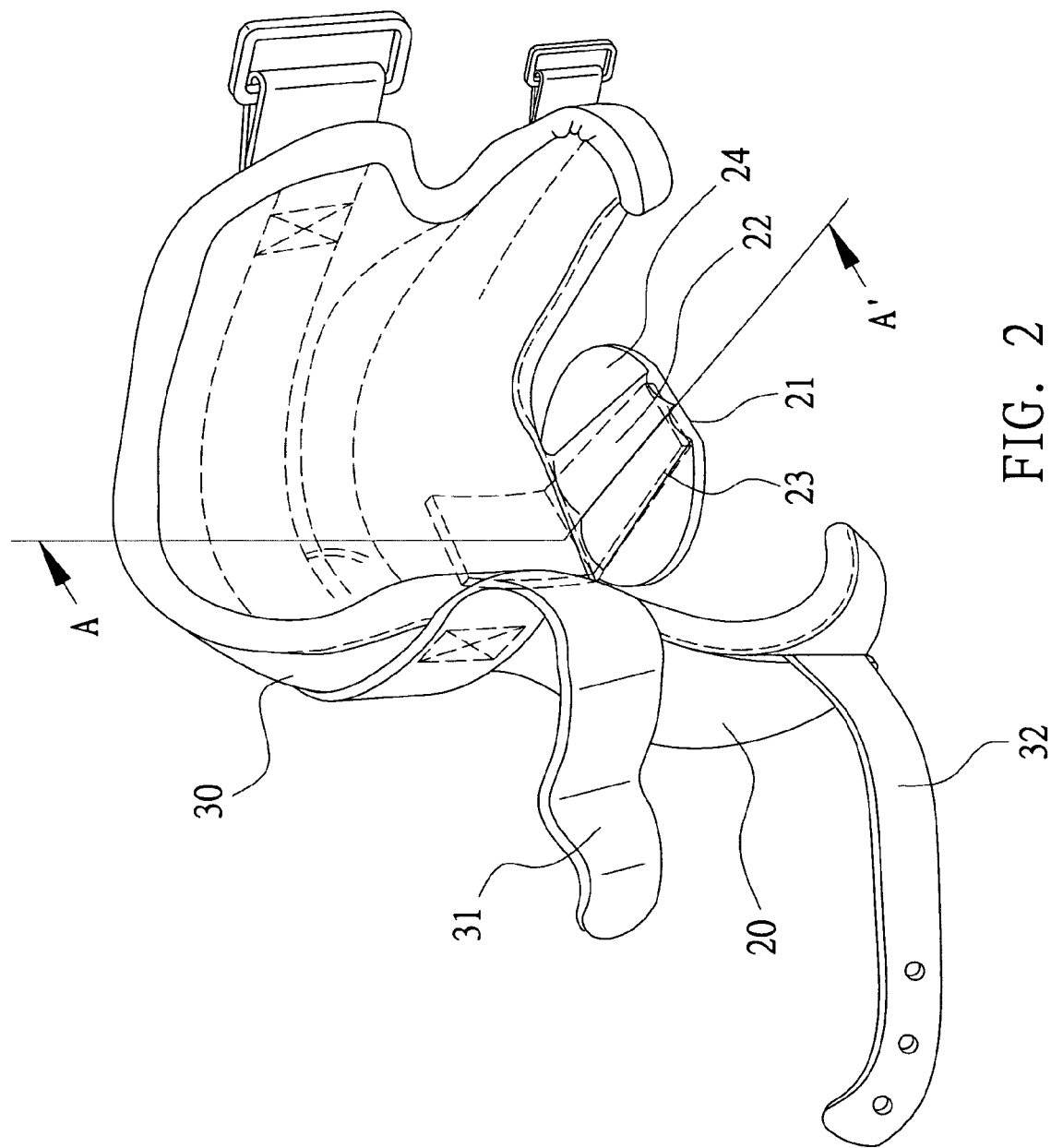
FIG. 2 is a schematic view of a structure of a preferred embodiment of the present invention.
Figure 4:
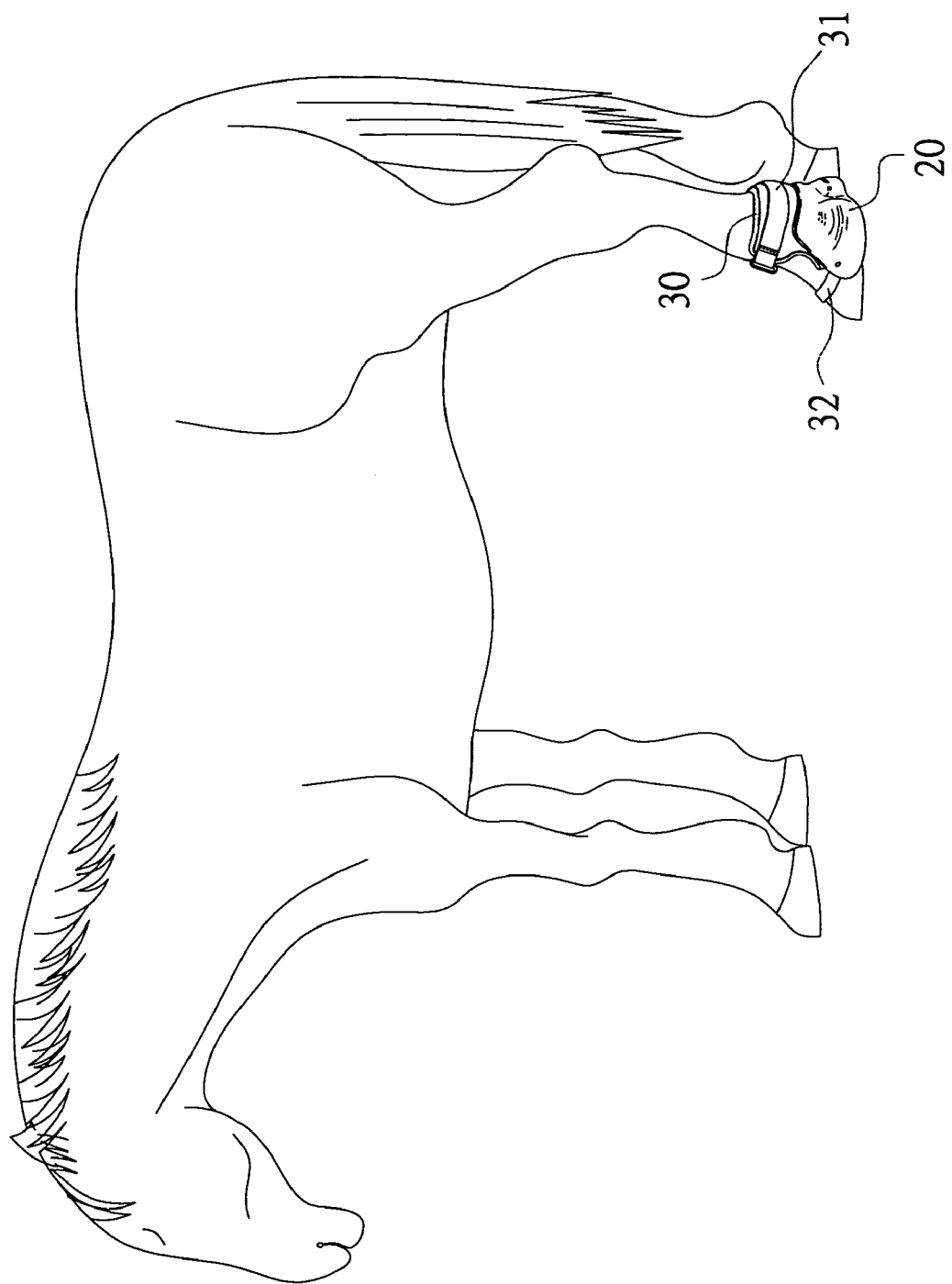
FIG. 4 is a schematic view of a preferred embodiment of the present invention.
Figure 5:
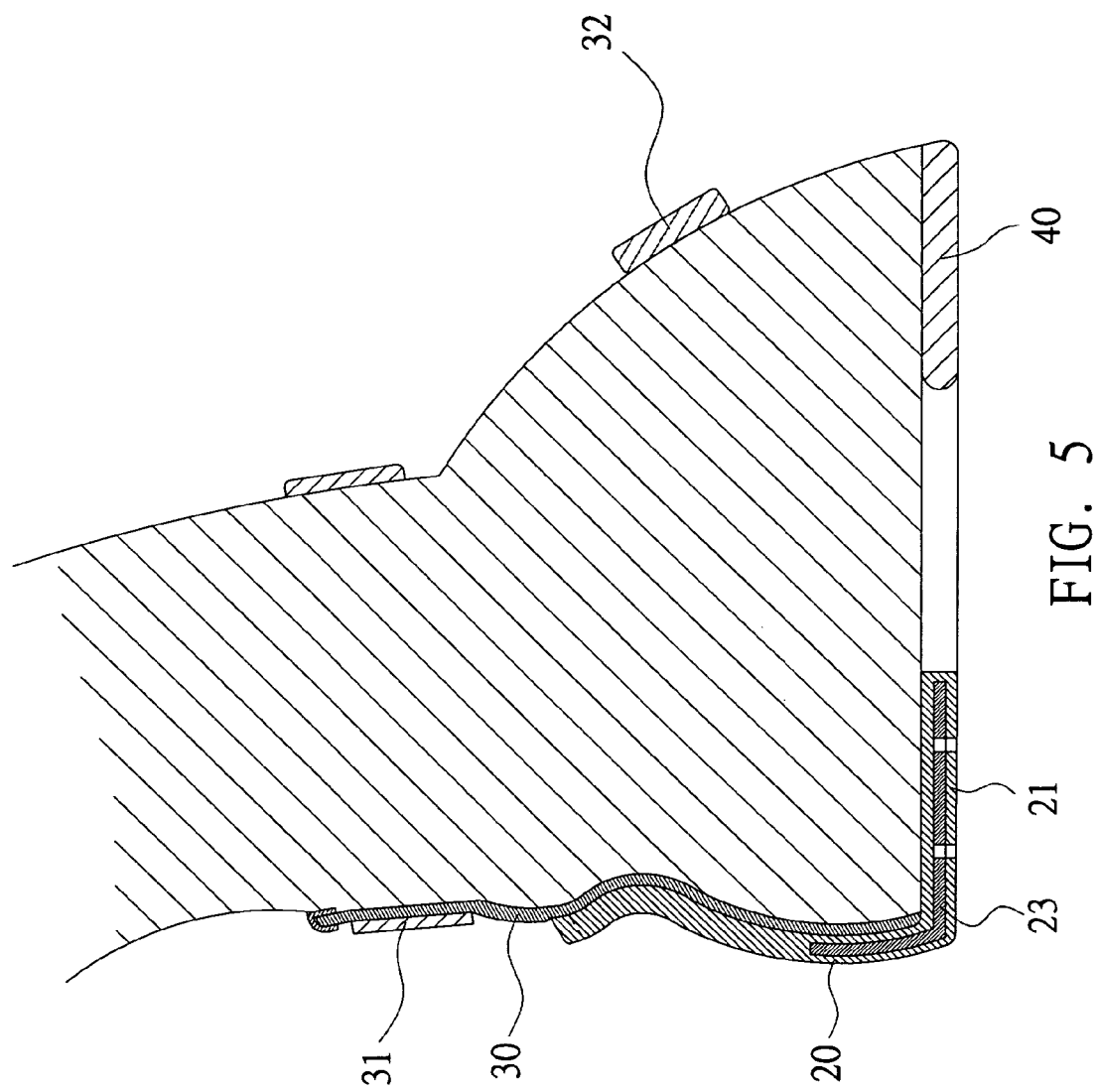
FIG. 5 is a schematic view of a structural relation of a preferred embodiment of the present invention.

Referring to FIG. 2 for a schematic view of a structure, FIG. 3 for a schematic view of structural relation, FIG. 4 for a schematic view of a preferred embodiment, and FIG. 5 for a structural relation of a preferred embodiment of the present invention, the structure of the invention comprises a hard protecting board 20 engaged with a horse's heel, a buffer support plate 21 extended from the center of the internal edge of the rear portion of the protecting board 20, a protrusion 22 disposed at the top of the buffer support plate 21 for supporting a horse's hoof, a soft elastic protecting plate 30 sewed appropriately into an internal edge of the protecting board 21, a Velcro strap 31 disposed at an upper edge of the protecting plate 30, a tying strap 32 disposed at a lower edge of the protecting plate 30, so as to constitute the basic functional architecture of the protecting apparatus for a horse in accordance with the present invention.

To overcome the foregoing shortcomings of a conventional protecting apparatus, the present invention includes a L-shaped metal plate 23 in the interior of the central position of an internal edge of a rear portion of the buffer support plate 21 of the protecting board 20, and the metal plate 23 is extended upward to an appropriate height, and both lateral edges of the buffer support plate 21 further include two symmetric winged plates 24 for increasing the supporting area to constitute the improved protecting apparatus structure of the present invention.

In the foregoing structural design, the metal plate 23 is included inside the buffer support plate 21 for obtaining the existing supporting strength as well as effectively preventing the metal plate 23 from being directly touched or rubbed with the bottom of the horse's hoof and heel to overcome the shortcomings of the prior art that causes discomforts or injuries to the horse. With the protrusion 22 disposed at the top of the buffer support plate 21 and the winged plates 24 disposed separately on both lateral edges of the buffer support plate 21, the supporting area and buffer effect on the bottom of the horse's hoof can be increased effectively. Furthermore, the overall wearing situates the buffer support plate 21 of the protecting apparatus at an indented position at the rear end of the horseshoe 40, so that the horseshoe 40 forms a comprehensive supporting and cushioning effects for the bottom of the horse's hoof, so that the stress produced at the horse's hoof while the horse is running or jumping can be buffered and offset directly by the supporting board 21, so as to lower the chance of discomforts or injuries to the horse. In other words, the protecting apparatus worn on a horse can provide a comfortable and safety protection to the horse while the horse is running or jumping.

In similar products with the existing functional architecture, the protecting apparatus for a horse has a metal plate included integrally inside a baffle and the interior of the buffer support plate for reducing the pressure of the horse's hoof, and the winged plates extended from both lateral sides of the buffer support plate can increase the supporting area, such that the overall buffering effect can be enhanced to provide an effective safety protection for the horse's hoof. The present invention definitely can overcome the shortcomings of the prior art.

In summation of the description above, an improved design of a protecting apparatus for a horse in accordance with the present invention herein enhances the performance over the conventional structure, and definitely can overcome the shortcomings of the prior art and comply with the requirements of patent application, and is thus duly filed for patent application.

What is claimed is:

1. A protecting apparatus structure for a horse, comprising: a hard protecting board engaged with a horse's heel, a buffer support plate extended from the center of an internal edge at a rear portion of said protecting board, a L-shaped metal plate disposed on said buffer support plate, a soft elastic protecting plate sewed appropriately into an internal edge of said protecting board, a Velcro strap disposed at an upper edge of said protecting plate, and a tying strap disposed at a lower edge of said protecting plate, wherein said L-shaped metal plate extends from the center of the internal edge of the rear portion of said hard protecting board is clamped inside said buffer support plate and said protecting board, and both lateral sides of said buffer support plate further include two winged plates for increasing a supporting area.

2. The protecting apparatus for a horse, wherein said buffer support plate extended from the center of the internal edge of the rear portion of said hard protecting board includes a protrusion disposed at the central position of the top of said buffer support plate for supporting a horse's hoof.

* * * * *